(12) United States Patent
Meadowcroft et al.

(10) Patent No.: US 9,791,645 B2
(45) Date of Patent: Oct. 17, 2017

(54) METHODS, DEVICES AND SYSTEMS THAT DISSIPATE HEAT AND FACILITATE OPTICAL ALIGNMENT IN OPTICAL COMMUNICATIONS MODULES

(71) Applicant: Avago Technologies General IP (Singapore) Pte. Ltd., Singapore (SG)

(72) Inventors: David J. K. Meadowcroft, San Jose, CA (US); Robert G. Ritter, Los Altos, CA (US); Pengyue Wen, San Jose, CA (US); Hui Xu, Santa Clara, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/872,043

(22) Filed: Sep. 30, 2015

(65) Prior Publication Data

US 2017/0090130 A1    Mar. 30, 2017

(51) Int. Cl.
G02B 6/42 (2006.01)
G02B 6/43 (2006.01)
G02B 6/32 (2006.01)
G02B 6/26 (2006.01)
H04B 10/00 (2013.01)
(Continued)

(52) U.S. Cl.
CPC ............... *G02B 6/425* (2013.01); *G02B 6/26* (2013.01); *G02B 6/32* (2013.01); *G02B 6/4206* (2013.01); *G02B 6/4214* (2013.01); *G02B 6/4244* (2013.01); *G02B 6/4245* (2013.01); *G02B 6/4246* (2013.01); *G02B 6/4267* (2013.01); *G02B 6/4292* (2013.01); *G02B 6/4295* (2013.01); *G02B 6/43* (2013.01); *G06F 1/16* (2013.01); *H04B 10/30* (2013.01); *H04B 10/40* (2013.01)

(58) Field of Classification Search
CPC .......... G02B 6/26; G02B 6/32; G02B 6/4201; G02B 6/4206; G02B 6/4214; G02B 6/4244; G02B 6/4245; G02B 6/4246; G02B 6/425; G02B 6/4267; G02B 6/4292; G02B 6/4295; G02B 6/43; H04B 10/00; H04B 10/30; H04B 10/40; H04B 10/43; G06F 1/16
USPC ........................................ 385/14, 33, 88–92
See application file for complete search history.

(56) References Cited

U.S. PATENT DOCUMENTS 7,504,701 B2 * 3/2009 Moribayashi ........ G02B 6/4214
257/440
8,351,794 B2    1/2013 Meadowcroft et al.
(Continued)

*Primary Examiner* — Akm Enayet Ullah
*Assistant Examiner* — Michael Mooney

(57) ABSTRACT

A heat dissipation system for an optical communications module is provided that includes a cold block on which the optoelectronic components and a lens assembly of an OSA of the module are mounted. The cold block has precisely-controlled mounting surface heights that precisely passively align the lens assembly in directions normal to mounting surfaces of the cold block. The cold block is made of a material of very high thermal conductivity, typically copper, so that heat generated by the optoelectronic components is dissipated into the cold block to maintain the optoelectronic components well below maximum allowable temperatures. In addition, an optical interface device of the OSA has a low-profile and an optical configuration that allows it to be used with a high optical fiber count.

20 Claims, 14 Drawing Sheets

(51) Int. Cl.
  *H04B 10/40* (2013.01)
  *G06F 1/16* (2006.01)

(56) References Cited

U.S. PATENT DOCUMENTS

2004/0146253 A1  7/2004  Wang et al.
2005/0175297 A1  8/2005  Mazotti et al.

* cited by examiner

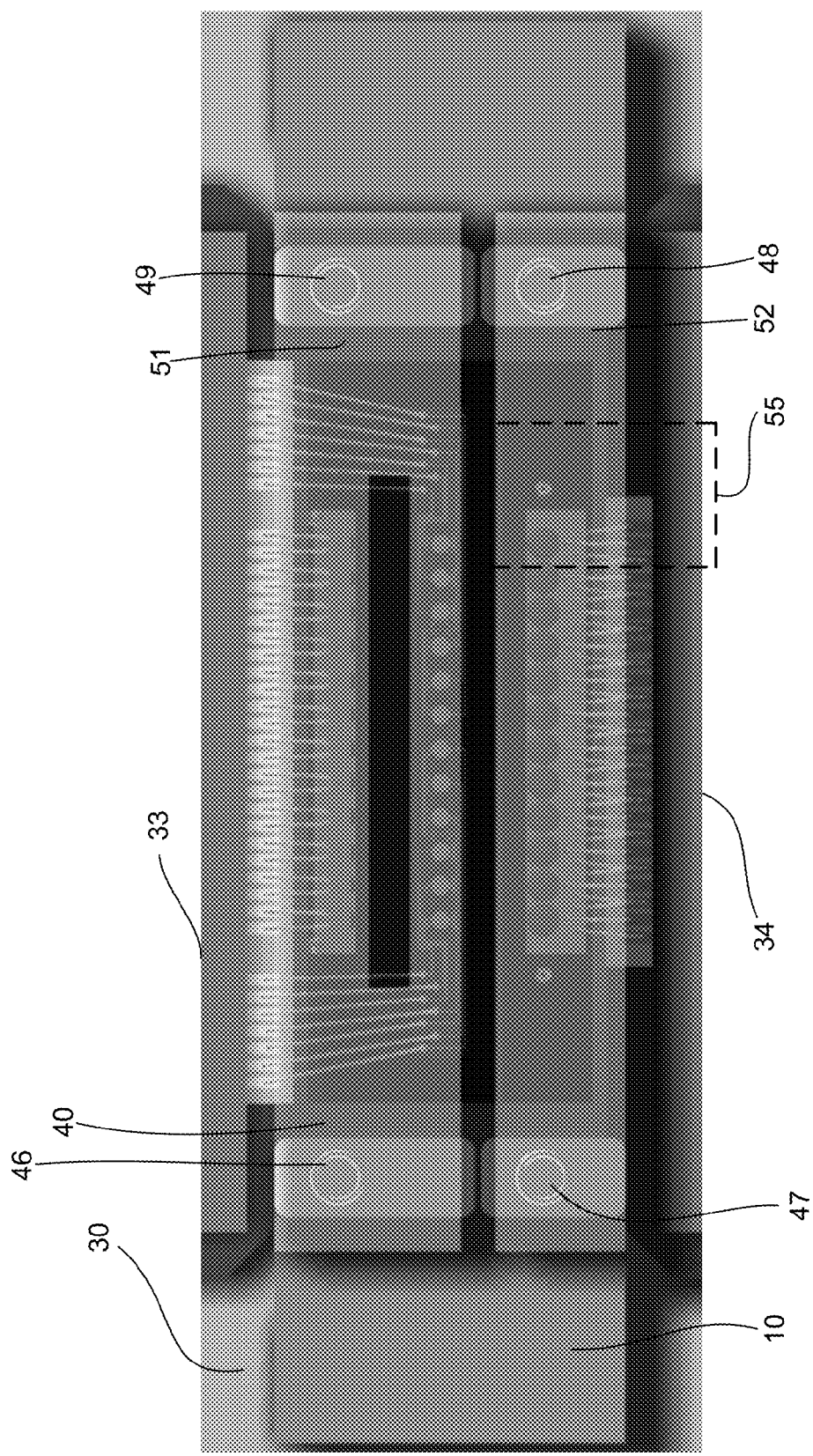

METHODS, DEVICES AND SYSTEMS THAT DISSIPATE HEAT AND FACILITATE OPTICAL ALIGNMENT IN OPTICAL COMMUNICATIONS MODULES

TECHNICAL FIELD OF THE INVENTION

The invention relates to optical communications modules. More particularly, the invention relates to heat dissipation systems and optics systems used in optical communications modules.

BACKGROUND OF THE INVENTION

A variety of parallel optical communications modules exist for simultaneously transmitting and/or receiving multiple optical data signals over multiple respective optical data channels. Parallel optical transmitter modules have multiple optical transmit channels for simultaneously transmitting multiple optical data signals over multiple respective optical waveguides (e.g., optical fibers). Parallel optical receiver modules have multiple optical receive channels for simultaneously receiving multiple respective optical data signals over multiple respective optical waveguides. Parallel optical transceiver modules have multiple optical transmit channels and multiple optical receive channels for simultaneously transmitting and receiving multiple optical data signals over multiple respective transmit and receive optical waveguides. Bidirectional (BiDi) parallel optical transceiver modules have multiple BiDi channels for simultaneously transmitting and receiving optical data signals over each channel.

For each of these different types of parallel optical communications modules, a variety of designs and configurations exist. A typical layout for a parallel optical communications module includes a housing and a circuit board, such as a printed circuit board (PCB), disposed inside of the housing. Various electrical components and optoelectronic components (i.e., laser diodes and/or photodiodes) are mounted on the circuit board. Such mounting arrangements are often referred to as chip-on-board (COB) mounting arrangements.

In a typical COB mounting arrangement, a plurality of laser diodes, a plurality of photodiodes, a laser diode driver integrated circuit (IC), a receiver IC, and various other electrical components are mounted on and electrically interconnected with the circuit board. Parallel optical transmitter and transceiver modules typically also include a plurality of monitor photodiodes for monitoring the optical output power levels of the laser diodes. The laser diode driver IC adjusts the modulation and/or bias currents of the laser diodes based on the monitored optical output power levels.

Laser diodes are very sensitive to temperature. Generally, in order to increase the speed of laser diodes without sacrificing reliability, the operating temperatures of the laser diodes need to be kept at or below some maximum allowable temperature. Photodiodes are also sensitive to temperature, but generally not as sensitive as laser diodes. Heat dissipation solutions for optical communications modules are designed to prevent the temperatures of the laser diodes and photodiodes from rising above maximum allowable temperatures. For example, for high speed performance, it may be necessary to maintain the temperature of the laser diodes at or below 80° Celsius (C), and in some cases, at or below 70° C.

The laser diodes, receive photodiodes and monitor photodiodes are often arranged in respective arrays formed in respective semiconductor chips. These chips are typically mounted on a metal heat sink pad of the circuit board, which in many cases is the electrical ground plane of the circuit board. Heat generated by the chips is dissipated into the heat sink pad. Air flow through the housing is often used to assist in heat dissipation. In these types of heat dissipation systems, the temperatures of the laser diodes can rise above 80° C., particularly when the laser diodes are in their active power states. Such high temperatures can lead to poor performance and can shorten the life expectancies of the laser diodes. A need exists for a heat dissipation solution that is effective at maintaining the temperatures of active elements such as laser diodes and photodiodes at or below maximum allowable temperatures, particularly in parallel optical communications module that have a plurality of laser diodes and photodiodes that generate a large amount of heat.

Another common component of a typical parallel optical communications module is the optical subassembly (OSA). The OSA optically couples light between the ends of optical waveguides (e.g., optical fibers) and the laser diodes and photodiodes of the module. OSAs that are used in parallel optical communications modules typically include one or more rows of optical elements (e.g., collimating lenses) that couple light between the ends of the respective optical waveguides and the module. Along each of the associated optical pathways, the OSA typically includes additional optical elements, such as total internal reflection (TIR) lenses, for example, for operating on the light beams propagating along the respective pathways. For example, in COB mounting solutions of the type described above, the OSA commonly employs TIR surfaces along the optical pathways for turning the optical pathways by 90° relative to the optical axes of the optical fibers.

As the number of channels of parallel optical communications modules and the number of fibers increase, the number of rows of optical elements in the OSA that provide the optical interface between the ends of the optical fibers and the module also increases. This increase in the number of rows of optical elements in the OSAs can lead to an increase in the height of the optical communications module, which can lead to an increase in overall system size, reduced module mounting density and an increase in system costs. A need exists for an OSA that can accommodate a large fiber count while also having a low profile.

BRIEF DESCRIPTION OF THE DRAWINGS

FIG. 4A illustrates an enlarged top view of the portion of the module shown in FIG. 3 in the dashed box 45.

WRITTEN DESCRIPTION

Figure 1A:
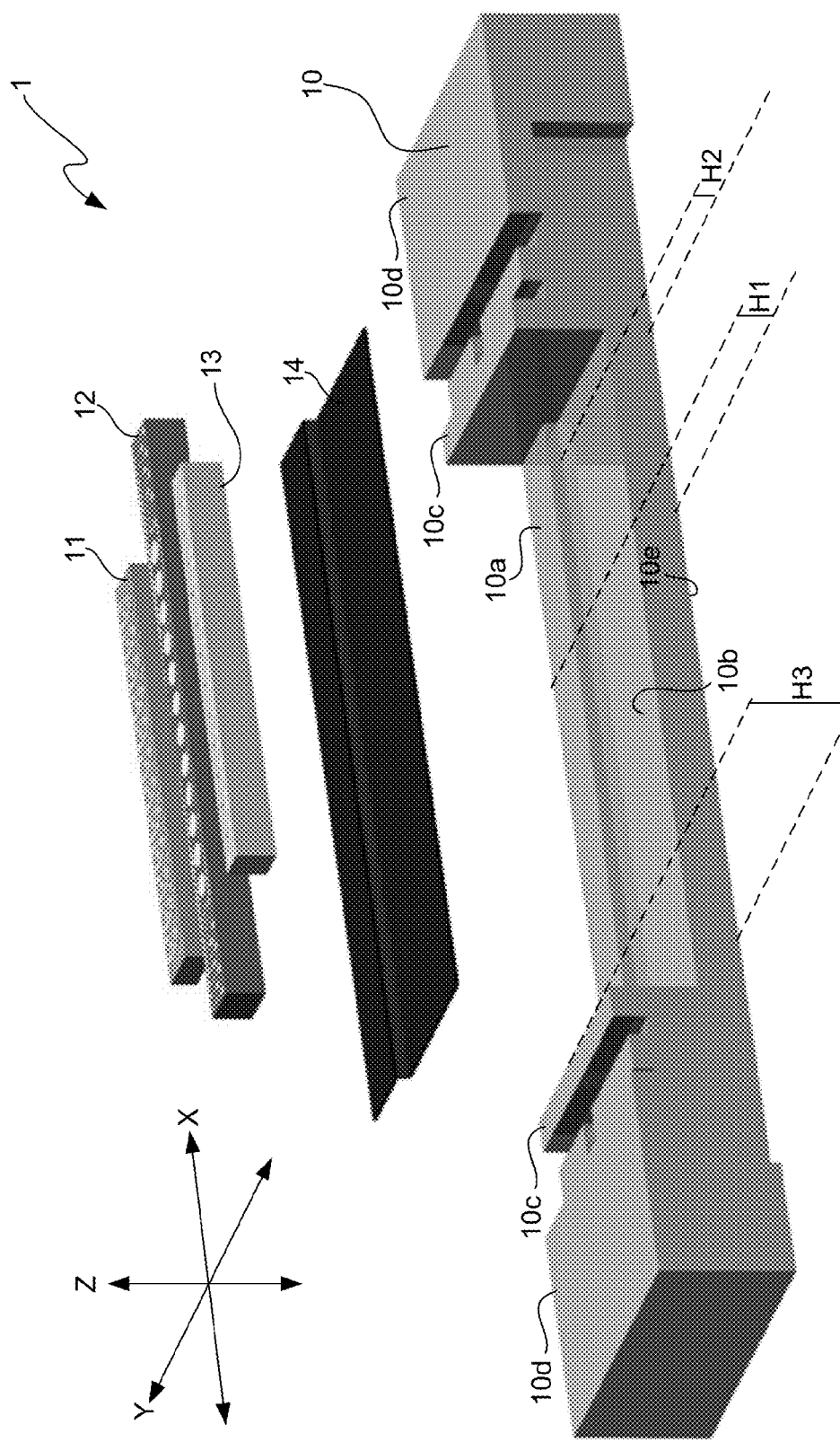
FIG. 1A illustrates an exploded perspective view of a COB mounting arrangement that includes a cold block and a plurality of optoelectronic components.

In accordance with illustrative embodiments described herein, a heat dissipation system for an optical communications module is provided that includes a cold block on which the optoelectronic components and the lens assembly of the OSA of the module are mounted. The cold block has precisely-controlled mounting surface heights that precisely passively align the lens assembly with the optoelectronic components in directions normal to the mounting surfaces. The cold block is made of a material of very high thermal conductivity, typically copper, so that heat generated by the optoelectronic components is dissipated into the cold block to maintain the optoelectronic components well below maximum allowable temperatures. In addition, an optical interface device of the OSA has a low profile and an optical configuration that allows it to be adapted for use with a high optical fiber count.

Illustrative, or exemplary, embodiments of the heat dissipation system, the OSA and a parallel optical communications module in which they may be incorporated will now be described with reference to the figures, in which like reference numerals represent like components. It should be noted that features, elements or components in the figures are not necessarily drawn to scale, emphasis instead being placed on demonstrating principles and concepts of the invention.

Figure 1B:
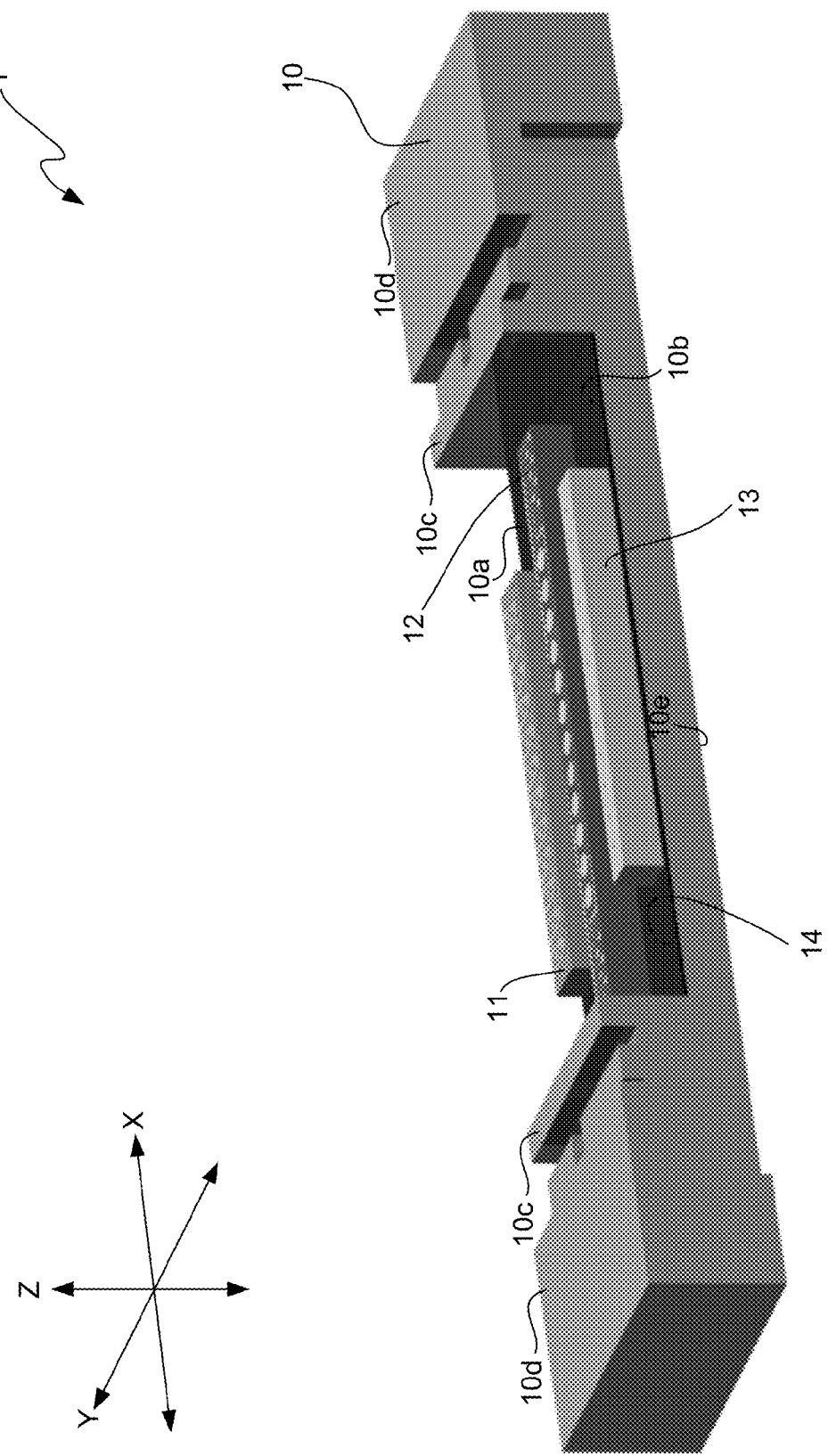
FIG. 1B illustrates a perspective view of the COB mounting arrangement shown in FIG. 1A with the optoelectronic components mounted on the cold block.

FIG. 1A illustrates an exploded perspective view of a COB mounting arrangement 1 that includes the cold block 10 and a plurality of optoelectronic components 11, 12 and 13. FIG. 1B illustrates a perspective view of the COB mounting arrangement 1 shown in FIG. 1A with the optoelectronic components 11, 12 and 13 mounted on the cold block 10. The optoelectronic components 11, 12 and 13 are a receive photodiode array semiconductor chip, a monitor photodiode array semiconductor chip and a vertical cavity surface emitting laser diode (VCSEL) array semiconductor chip, respectively. Each array chip has a 1×N array of optoelectronic elements formed in it, where N is a positive integer that is equal to or greater than 2. In accordance with this illustrative embodiment, N=12.

In accordance with an embodiment, the cold block 10 is an injection-molded part molded out of high-grade copper, although other processes and materials may be used to make the cold block 10. The cold block 10 has first, second and third mounting surfaces 10a, 10b and 10c, respectively, formed therein that are at different, precisely-controlled heights, H1, H2 and H3, respectively. The mounting surface 10a is used for mounting the receive photodiode array chip 11. The mounting surface 10b is used for mounting the monitor photodiode array chip 12 and the VCSEL array chip 13. The mounting surface 10c is used for mounting the lens assembly (not shown) of the OSA, as will be described below in more detail. The surface areas 10d are used for mechanically coupling an external heat dissipation device (not shown) to the cold block 10 to dissipate heat from the cold block 10. A thin layer of adhesive material, such as epoxy 14 (e.g., approximately twenty micrometers thick), is used to bond the chips 11-13 to the mounting surfaces 10a and 10b.

The cold block 10 can be designed and manufactured to have as many different mounting surfaces as are needed and the mounting surfaces can have any desired heights. The heights of the mounting surfaces are selected based on the heights of the optoelectronic components and based on how far their top surfaces need to be positioned away from the lens assembly to achieve optical alignment in directions normal to the mounting surfaces 10a, 10b and 10c, which correspond to the Z-direction of the X, Y, Z Cartesian coordinate system shown in FIGS. 1A and 1B. The heights H1, H2 and H3 of the mounting surfaces 10a, 10b and 10c shown in FIGS. 1A and 1B correspond to the distance of these surfaces away from a lower surface 10e of the cold block 10 in the Z-dimension. The photosensitive areas of the photodiodes of the chips 11 and 12 are disposed at or very near the top surfaces of the chips 11 and 12. Likewise, the light-emitting facet of the chip 13 is disposed at or very near its top surface. Thus, in the illustrative embodiment shown in FIGS. 1A and 1B, the heights H1 and H2 were chosen based on the heights of the chips 11, 12 and 13 and the height H3 is chosen to position a bottom surface of the lens assembly (not shown) at particular distance away from the top surfaces of the chips 11, 12 and 13. Therefore, mounting the chips 11, 12 and 13 on the mounting surfaces 10a and 10b and mounting the lens assembly on the mounting surface 10c precisely passively aligns the VCSELs and photodiodes with the lens assembly in the Z-dimension.

Figure 2A:
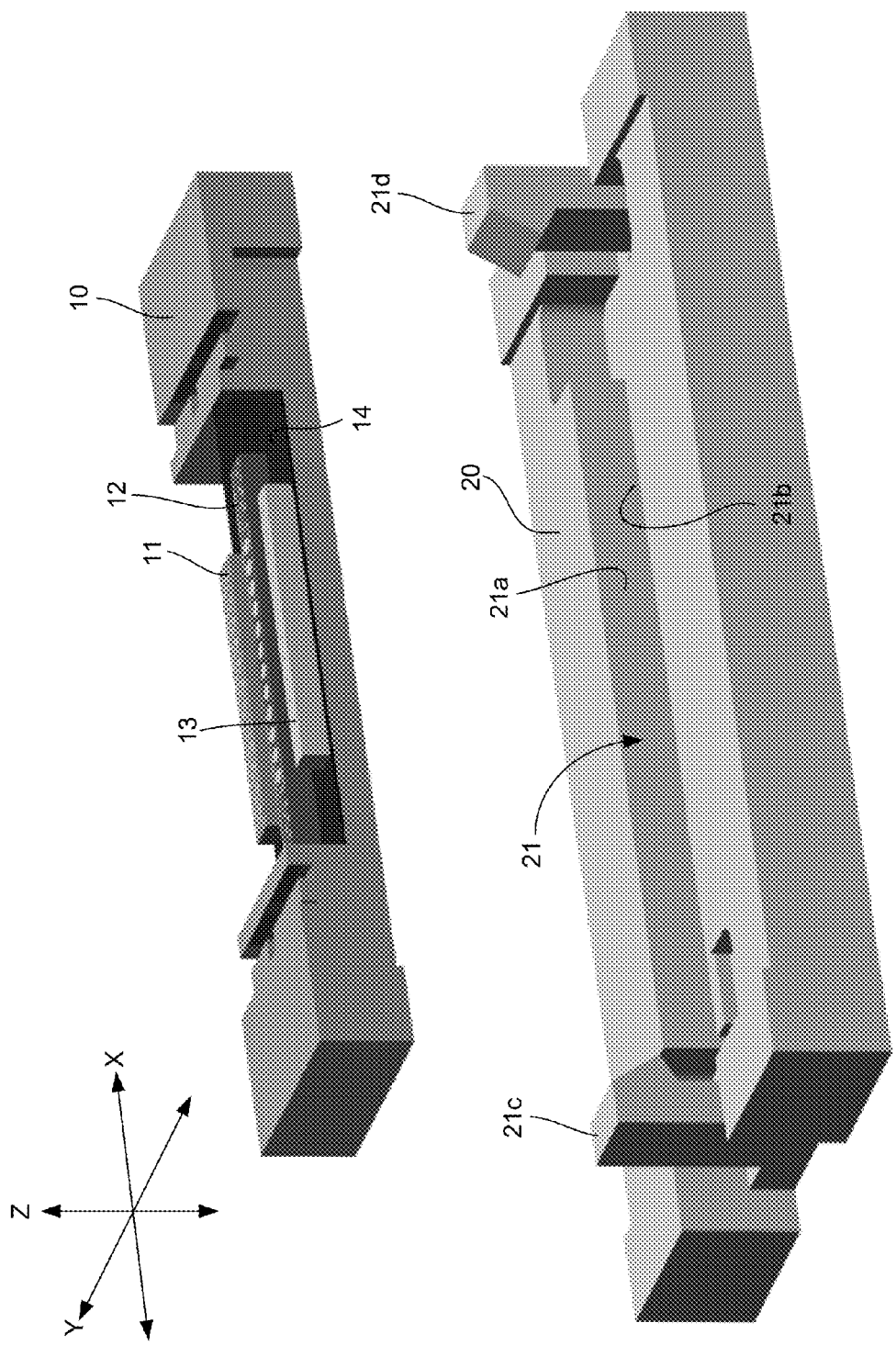
FIG. 2A illustrates a perspective view of the COB mounting arrangement shown in FIGS. 1A and 1B positioned above a clip to which the cold block of the arrangement will be removably secured in order to mount the optoelectronic components shown in FIGS. 1A and 1B on the cold block.
Figure 2B:
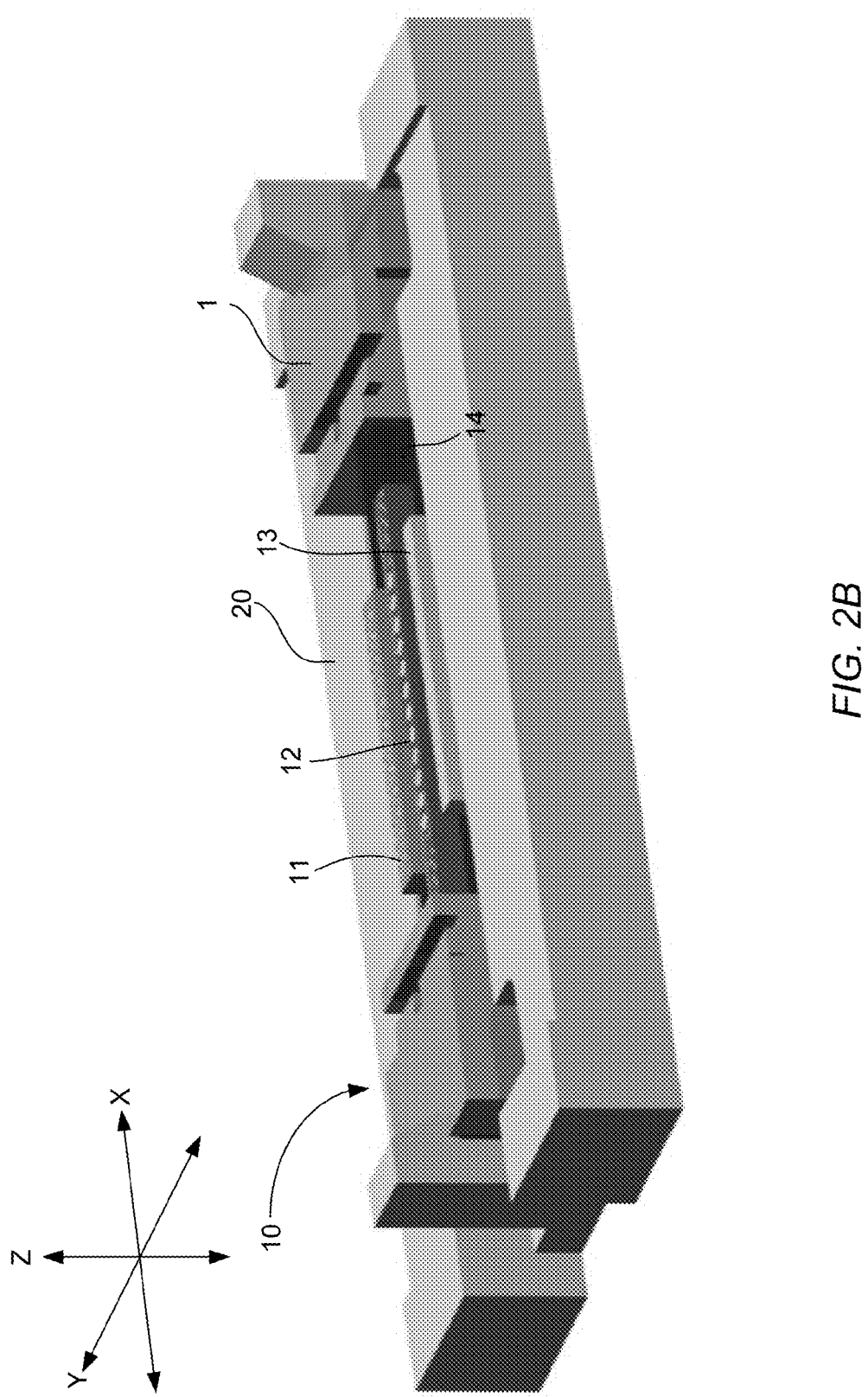
FIG. 2B illustrates a perspective view of the COB mounting arrangement shown in FIGS. 1A and 1B removably secured to the clip.

FIG. 2A illustrates a perspective view of the COB mounting arrangement 1 shown in FIGS. 1A and 1B positioned above a clip 20 to which the cold block 10 of the arrangement 1 may be removably secured in order to mount the optoelectronic components 11, 12 and 13 on the cold block 10. FIG. 2B illustrates a perspective view of the COB mounting arrangement 1 shown in FIGS. 1A and 1B removably secured to the clip 20. The clip 20 is an example of a fixture that may be used to assemble the COB mounting arrangement 1 and is not necessary to use such a fixture. Other assembly methods may be used to assemble the arrangement 1, as will be understood by those of skill in the art, in view of the description provided herein.

As shown in FIG. 2A, the clip 20 has an opening 21 therein that is defined in the Y-direction by opposing side walls 21a and 21b and in the X-direction by opposing resilient snap clip features 21c and 21d. The opening 21 has a width in the Y-dimension that is substantially equal to the width of the cold block 10 in the Y-dimension. The resilient snap clip features 21c and 21d are spaced apart from one another in the X-dimension by a distance that is slightly smaller than the length of the cold block 10 in the X-dimension.

Although FIG. 2A shows the optoelectronic components mounted on the cold block 10 prior to the cold block 10 being secured to the chip 20, the optoelectronic components 11, 12 and 13 are typically not secured to the cold block 10 until after the cold block 10 has been snap clipped into the clip 20, as will now be described.

Prior to attachment of the optoelectronic components 11-13 to the cold block 10, the cold block 10 is snap clipped into the clip 20 by pressing the cold block 10 into the opening 21, which causes the resilient snap clip features 21c and 21d to deflect outwardly as they engage opposite ends of the cold block 10. An epoxy 14 is then dispensed onto the mounting surfaces 10a and 10b. A variety of adhesive materials may be used for this purpose. In accordance with an illustrative embodiment, the adhesive material is a silver conductive epoxy. The optoelectronic components 11-13 are placed on the epoxy-covered mounting surfaces 10a and 10b and the epoxy 14 is cured, or hardened, thereby fixedly securing the optoelectronic components 11-13 to the cold block 10. The side walls 21a and 21b prevent the epoxy 14 from protruding for the sides of the mounting arrangement 1 (the Y-direction in FIGS. 1A and 1B), which allows other chips (not shown) to be mounted in very close proximity to the sides of the mounting arrangement 1, as will be described below with reference to FIG. 3.

Figure 3:
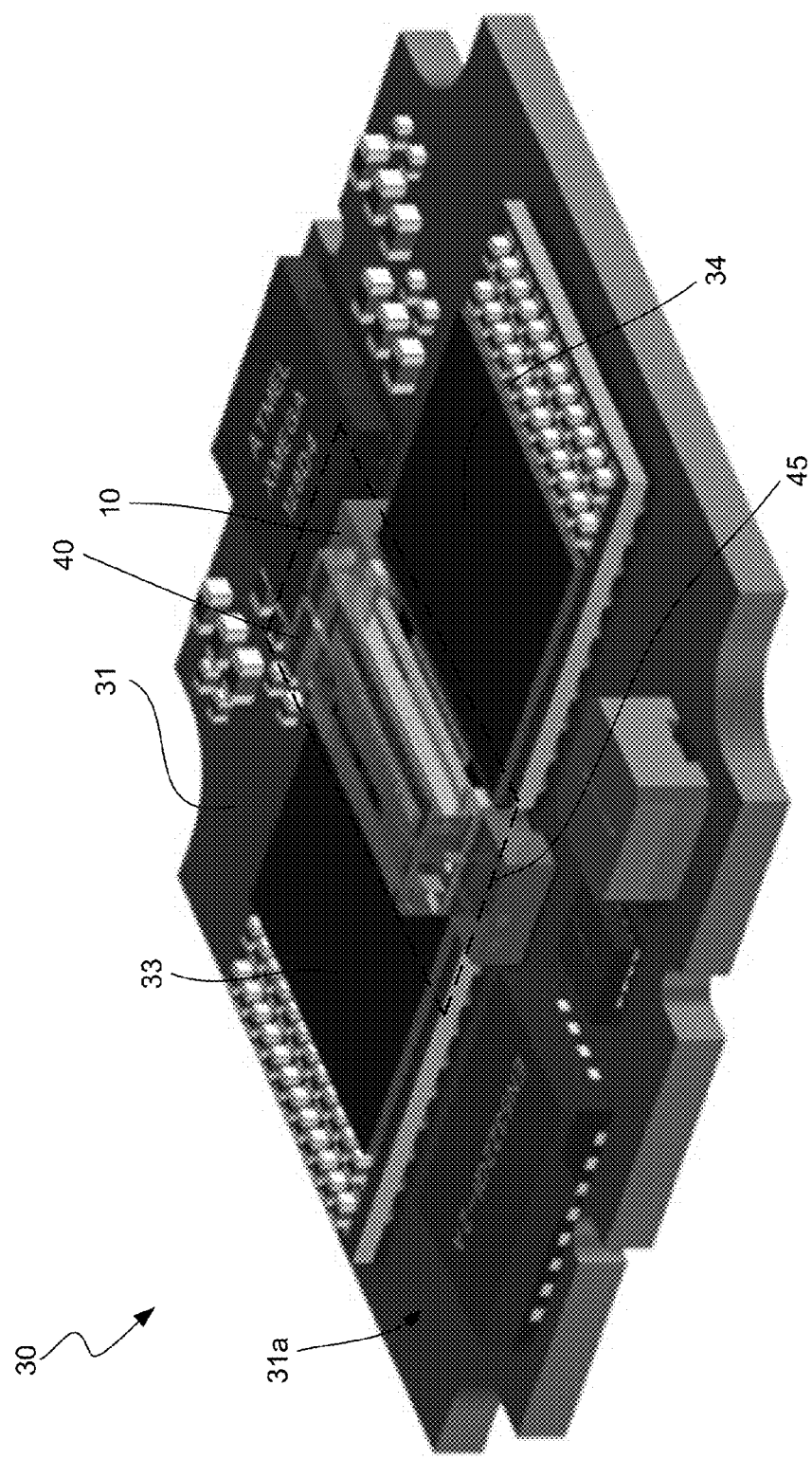
FIG. 3 illustrates a perspective view of a circuit board of an optical communications module having the COB mounting arrangement shown in FIGS. 1A and 1B mounted thereon.

FIG. 3 illustrates a perspective view of an illustrative embodiment of an optical communications module 30 without the module housing for clarity. The module 30 comprises a PCB 31, the COB mounting arrangement 1 shown in FIGS. 1A and 1B mounted on an upper surface 31a of the PCB 31, a lens assembly 40 secured to the cold block 10 of the arrangement 1, first and second combination laser diode driver/receiver IC chips 33 and 34 mounted on the upper surface 31a of the PCB 31, and various other electrical components mounted on the upper surface 31a of the PCB 31. In the illustrative embodiment shown in FIG. 3, the first and second combination laser diode driver/receiver IC chips 33 and 34 are flip-chip mounted on the PCB 31 to eliminate the need for bond wires, but in other embodiments the chips 33 and 34 may be mounted with their electrical contacts facing away from the upper surface 31a of the PCB 31 and bonded by bond wires to the electrical contacts of the PCB 31.

Because of way in which the clip 20 shown in FIG. 2 prevents epoxy from bleeding out of the arrangement 1, the combination laser diode driver/receiver IC chips 33 and 34 can be mounted in very close proximity to the sides of the cold block 10, which allows the electrical bond wires (not shown) that electrically interconnect the optoelectronic components 11-13 to the chips 33 and/or 34 to be kept very short. Keeping the electrical bond wires short helps reduce inductance, which helps maintain good signal integrity. The bond wire interconnections are made prior to mounting the lens assembly 40 on the cold block 10. As indicated above, it is not necessary to use the clip 20 during the assembly process. Other assembly processes may be used to prevent epoxy from bleeding out of the arrangement 1.

Thermal performance simulation was performed on a module having a COB mounting arrangement similar to that shown in FIG. 3 and it was determined through simulation that the cold block 10 kept the temperatures of the VCSEL array chip and of the receive photodiode array chip well below maximum allowable temperatures. During simulation, an inlet airflow of about 35° C. at a velocity of about 5 meters per second (m/s) was provided over the components. When the photodiodes and VCSELs were in the inactive power states, the temperatures of the chips remained below 60° C. When the photodiodes and VCSELs were in the active power states, the temperatures of the chips rose, but remained well below 70° C. The simulation was performed using a cold block that was made of copper and a cold block that was made of aluminum. The cold block that was made of copper performed better than the cold block that was made of aluminum, but both cold blocks provided very good performance results. Also, the simulation revealed that there was not an extremely large rise in the temperatures of the chips when operating in the active power versus inactive power states.

FIG. 4A illustrates an enlarged top view of the portion of the module 30 contained in the dashed box 45 shown in FIG. 3. In accordance with this illustrative embodiment, the lens assembly 40 has four recesses 46, 47, 48, and 49 formed therein into which UV light-curable epoxy is dispensed for bonding the lens assembly 40 to the mounting surfaces 10c (FIG. 1A) of the cold block 10. The lens assembly 40 comprises first and second lens blocks 51 and 52, respectively. The lower surfaces of the lens blocks 51 and 52 are in direct contact with the mounting surfaces 10c, which are also in direct contact with the epoxy disposed in the recesses 46-49. However, other than the epoxy disposed in the recesses 46-49, no epoxy is disposed in between the lower surfaces of the lens blocks 51 and 52 and the mounting surfaces 10c. The amount of epoxy that is dispensed into the recesses 46-49 is carefully controlled to ensure that no epoxy bleeds out from the recesses 46-49 onto the mounting surfaces 10c when the lens blocks 51 and 52 are mounted on the mounting surfaces 10c. This ensures that the lower surfaces of the lens blocks 51 and 52 are in direct abutment with the mounting surfaces 10c, which ensures that the laser diodes and photodiodes of array chips 11-13 are precisely aligned with the lens assembly 40 in the Z-dimension (FIG. 1A).

It should be noted that it is not necessary for the lens blocks 51 and 52 to be mounted on the same mounting surface of the cold block 10. In the illustrative embodiment described above with reference to FIGS. 1A and 1B, the optoelectronic chips 11 and 13 are mounted on different mounting surfaces of the cold block 10 that are at different heights to control the distance in the Z-direction between the top surfaces of these chips and the bottom surfaces of the lens blocks 51 and 52. Instead, the optoelectronic chips 11 and 13 could be mounted on the same mounting surface and the lens blocks 51 and 52 could be mounted on different surfaces of different heights to control the distances in the Z-direction between the top surfaces of these chips and the bottom surfaces of the lens blocks 51 and 52.

Figure 4B:
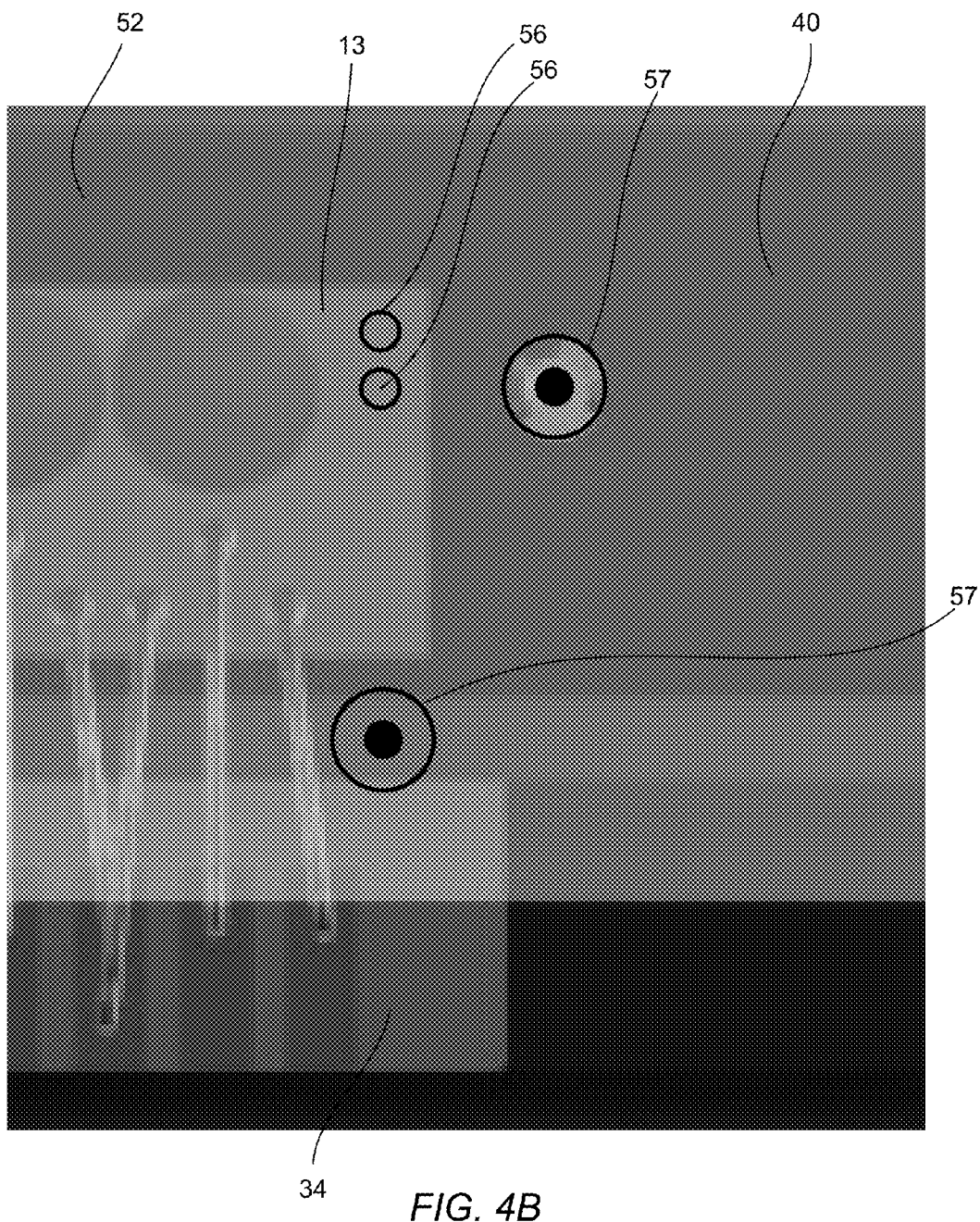
FIG. 4B illustrates a top view of the portion of the module shown in FIG. 4A in the dashed box 55.

FIG. 4B illustrates a top view of the portion of the module 30 shown in the dashed box 55 in FIG. 4A. The lens assembly 40 has a plurality of fiducial features 56 formed therein. Likewise, the optoelectronic chips 11-13 have fiducial features 57 formed therein. The fiducial features 56 are used by an image capture system (not shown) during an alignment and mounting process to mount the optoelectronic components 11-13 on the mounting surfaces 10a and 10b (FIG. 1A) of the cold block 10 in alignment in the X- and Y-dimensions with the cold block 10. As indicated above, the heights H1 and H2 (FIG. 1A) of the mounting surfaces 10a and 10b control the Z-dimensional alignment of the optoelectronic components 11-13. The fiducial features 56 and 57 are used together by the image capture system to mount the lens assembly 40 on the cold block 10 in alignment with the optoelectronic components 11-13 in the X- and Y-dimensions. As indicated above, Z-dimensional alignment between the lens assembly 40 and the optoelectronic components 11-13 is achieved passively through abutment between the lower surfaces of the lens blocks 51 and 52 and the mounting surfaces 10c (FIG. 1A) of the cold block 10.

Figure 5:
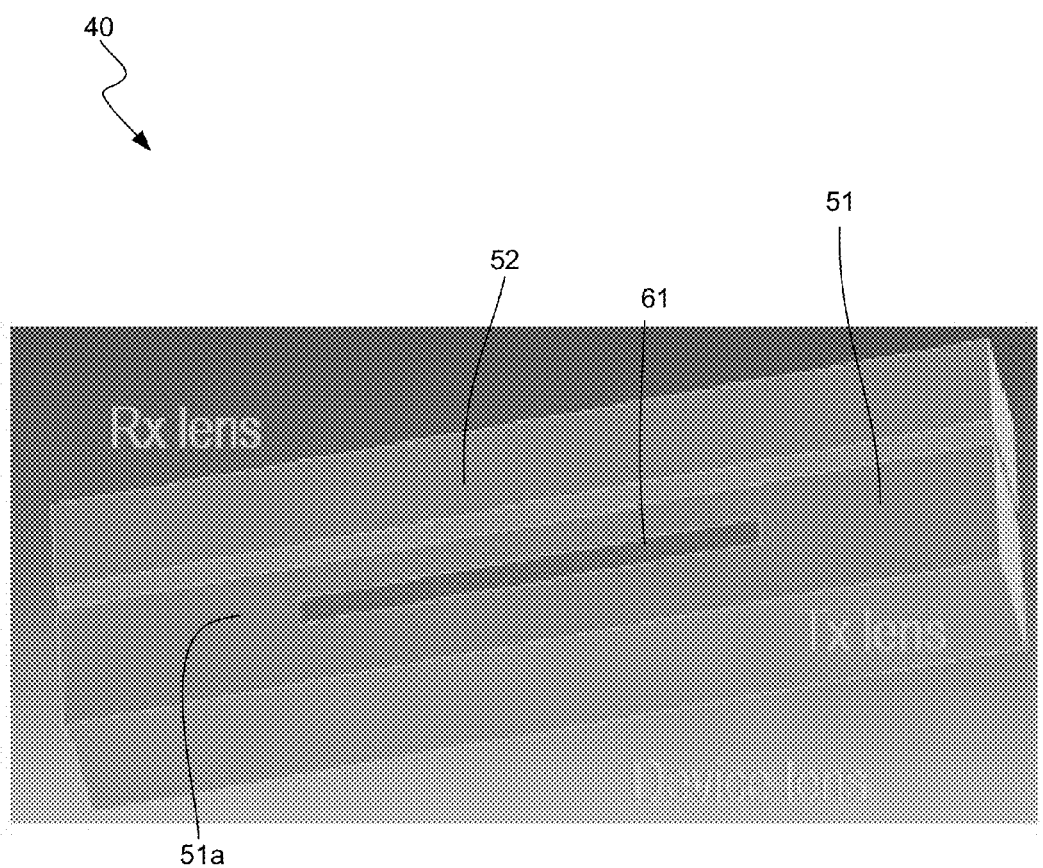
FIG. 5 illustrates a top perspective view of the lens assembly shown in FIGS. 3-4B.

FIG. 5 illustrates a top perspective view of the lens assembly 40 shown in FIGS. 3-4B. In accordance with this illustrative embodiment, the lens block 51 has an optical element 61 on its upper surface 51a that directs portions of the light beams produced by the VCSELs of the VCSEL array chip 13 onto the monitor photodiodes of the monitor photodiode array chip 12. In accordance with this embodiment, the optical element 61 is a mirror made of gold. For the remaining portions of the light beams emitted by the VCSELs of chip 13, the lens block 51 collimates the light beams and couples them into the optical interface device of the OSA described below with reference to FIGS. 6-9. For light beams being received by the module, the lens block 52 focuses the light beams onto the photosensitive areas of the receive photodiodes of chip 11. The optical operations that are performed by the lens assembly 40 are described below in more detail with reference to FIGS. 6-9.

Figure 6:
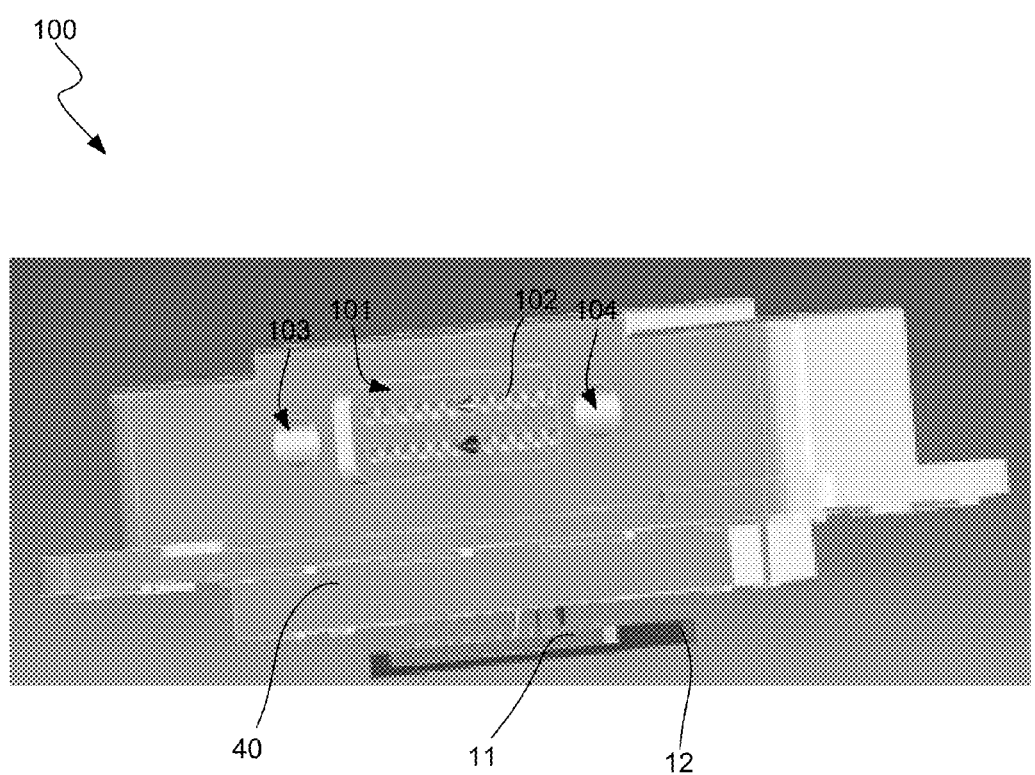
FIG. 6 illustrates a perspective view of an optical interface device of an OSA in accordance with an illustrative embodiment.

FIG. 6 illustrates a perspective view of the optical interface device 100 of the OSA in accordance with an illustrative embodiment shown positioned above the lens assembly 40 and the chips 11-13 to show the positional relationship between the optical interface device 100, the lens assembly 40 and the chips 11-13. For clarity, the cold block 10 is not shown in FIG. 6. In accordance with this embodiment, the optical interface device 100 is configured to mate with a multi-optical fiber ferrule of a multi-optical fiber push on (MPO) optical connector (not shown) commonly referred to in the optical communications industry as an MTP connector. The optical interface device 100 has a recess 101 formed in a front face thereof that has a 2×12 array of lenses disposed in it that are arranged in a top row 102a and a bottom row 102b. The array of lenses 102a and 102b acts as an optical port of the device 100. Because of the recess 101, the array of lenses 102a and 102b is spaced a precise distance away from the front face of the ferrule of the MTP connector when pins disposed on opposite sides of the front face of the ferrule are mated with complementary-shaped cylindrical holes 103 and 104 disposed in the front face of the optical interface device 100.

Figure 7:
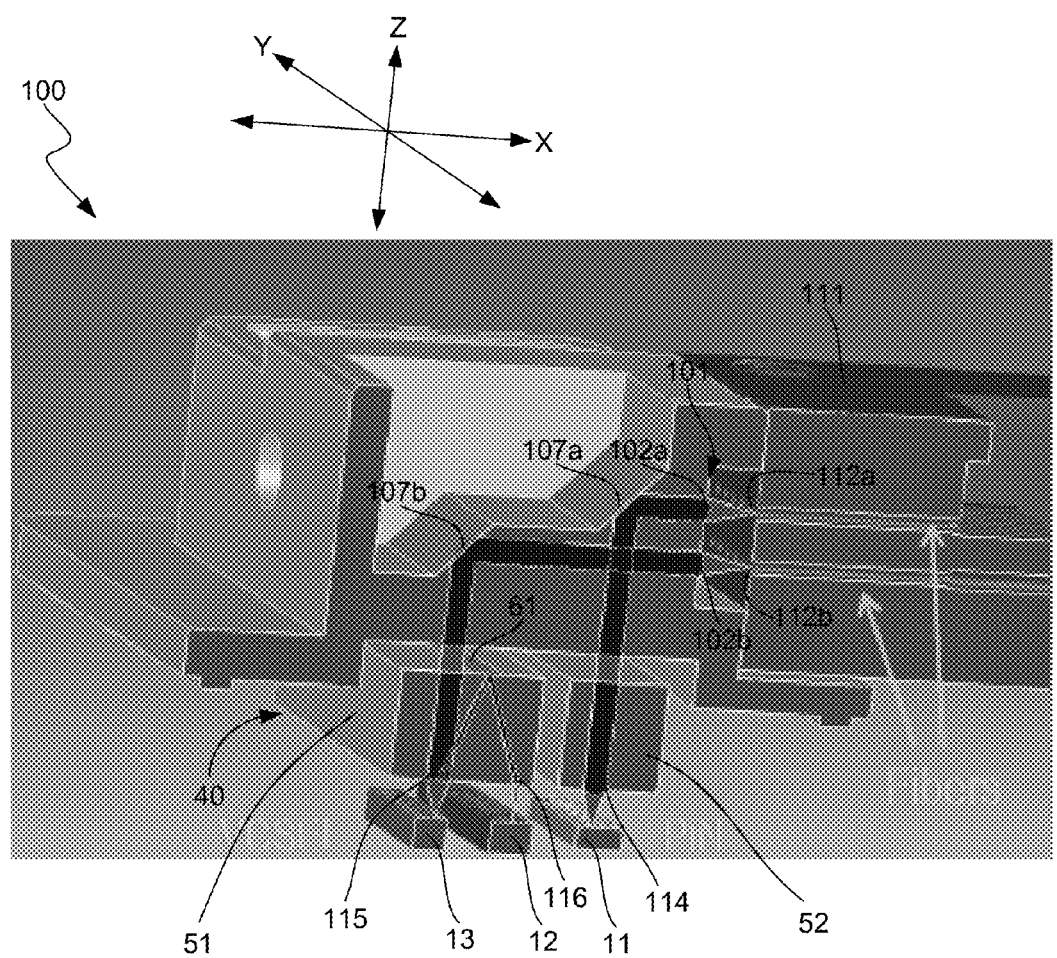
FIG. 7 illustrates a side cross-sectional view of the optical interface device shown in FIG. 6 engaged with a ferrule of an MTP connector.

FIG. 7 illustrates a side cross-sectional view of the optical interface device 100 shown in FIG. 6 engaged with a ferrule 111 of an MTP connector. The ferrule 111 holds ends of twenty-four optical fibers that are arranged in a 2×12 array comprising a top row 112a and a bottom row 112b of optical fibers. In the mated configuration of the MTP connector and the optical interface device 100 shown in FIG. 7, the ends of the fibers of the top and bottom rows 112a and 112b, respectively, of optical fibers are spaced a precise distance away from the respective lenses 102a and 102b. The optical interface device 100 has first and second total internal reflection (TIR) surfaces 107a and 107b disposed therein. The first TIR surface 107a is aligned with the top row of lenses 102a, with the top row of fibers 112a, and with the receive photodiodes of chip 11. The second TIR surface 107b is aligned with the bottom row of the lenses 102b, with the bottom row of the fibers 112b, and with the laser diodes of chip 13.

In the receive direction, the light beams passing out of the ends of the top row of fibers 112a are collimated by the respective lenses 102a and are turned by an angle of 90° by the first TIR surface 107a toward the lens assembly 40. Lens block 52 of the lens assembly 40 has an array of lenses 114 formed in the lower surface thereof that focus the respective light beams onto respective photodiodes of chip 11. The lens block 51 has an array of lenses 115 formed in the lower surface. In the transmit direction, the lenses 115 receive respective light beams emitted by respective laser diodes of chip 13, collimate the respective light beams and direct the collimated light beams toward the second TIR surface 107b. The second TIR surface 107b turns the collimated light beams by 90° toward the bottom row of lenses 102b disposed in the recessed front face of the optical interface device 100. The lenses 102b focus the respective light beams onto the ends of the bottom row of respective optical fibers 112b.

Portions of the light beams emitted by the laser diodes of chip 13 are directed by the optical element 61 toward an array of lenses 116 formed in the lower surface of the lens block 51. The lenses 116 focus these light beam portions onto respective monitor photodiodes of chip 12. Beam splitters that are integral parts of the lenses 115 disposed on the lower surface of the lens block 51 split off the portions of the light beams emitted by the laser diodes and direct the light beam portions toward the optical element 61.

The distance in the X-dimension between the first and second TIR surfaces 107a and 107b determines the relative positions of the chips 11 and 13. Thus, the distance between the top and bottom rows of the optical fibers 112a and 112b, respectively, has no bearing on the distance in the X-dimension between the chips 11 and 13 mounted on the cold block 10. This feature provides greater design flexibility and improves signal integrity by allowing the chips 11 and 13 to be placed far enough apart from one another to prevent optical crosstalk. In addition, this feature allows the fiber count to be increased without requiring an increase in the height (Z-dimension) of the optical interface device 100. In other words, the optical interface device 100 can have a low profile even as the fiber count is increased.

Because the light beams propagating between the lens blocks 51 and 52 and the optical interface device 100 are collimated, there is more tolerance in regard to aligning the lens blocks 51 and 52 with the optical interface device 100. For this same reason, the placement precision of the chips 11-13 on the cold block 10 is less critical. All of this facilitates alignment and helps ensure good optical coupling efficiency and good signal integrity.

Figure 8:
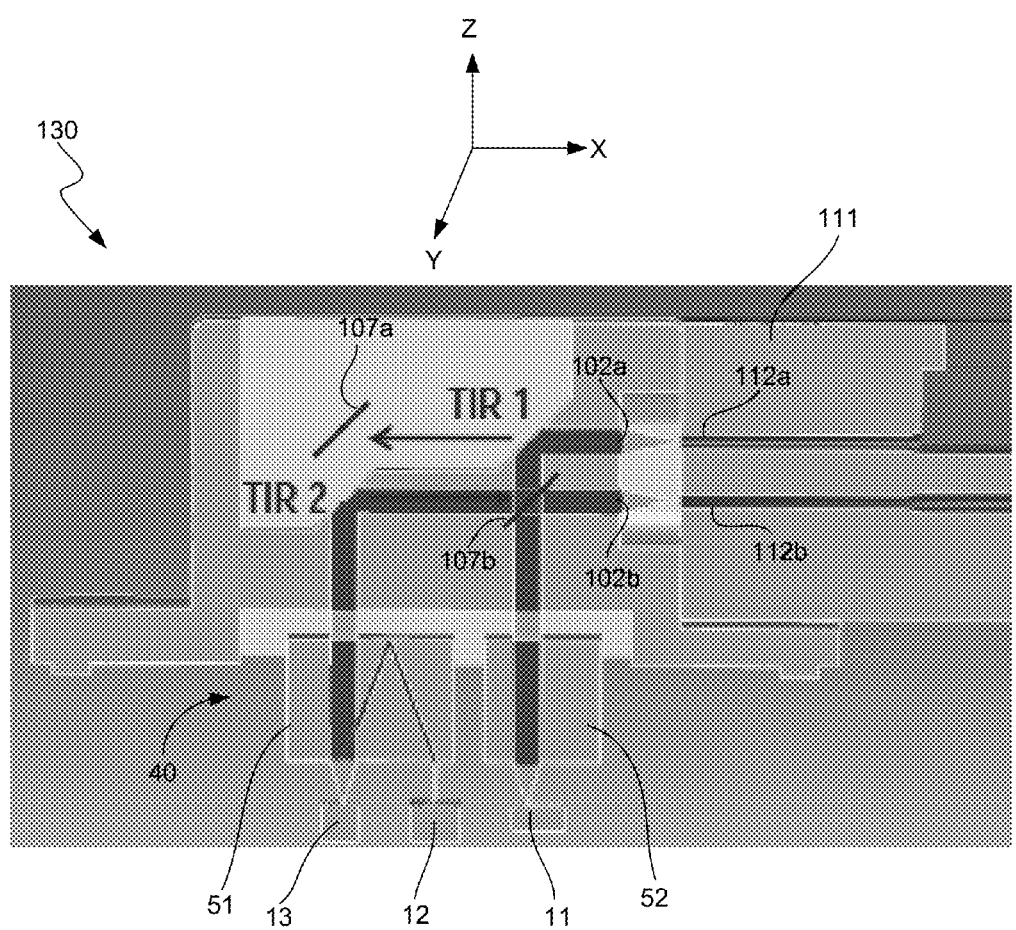
FIG. 8 illustrates a side cross-sectional view of an optical interface device in accordance with another illustrative embodiment.

FIG. 8 illustrates a side cross-sectional view of the optical interface device 130 in accordance with another illustrative embodiment. In accordance with this embodiment, the positions of the first and second TIR surfaces 107a and 107b have been switched in the X, Y dimensions. Switching the positions of the TIR surfaces 107a and 107b allows the positions of the chips 11 and 13 to be switched so that different electrical configurations and module pinouts can be achieved. If the positions of the chips 11 and 13 are switched in this way, the positions of the lens blocks 51 and 52 are also switched.

Figure 9:
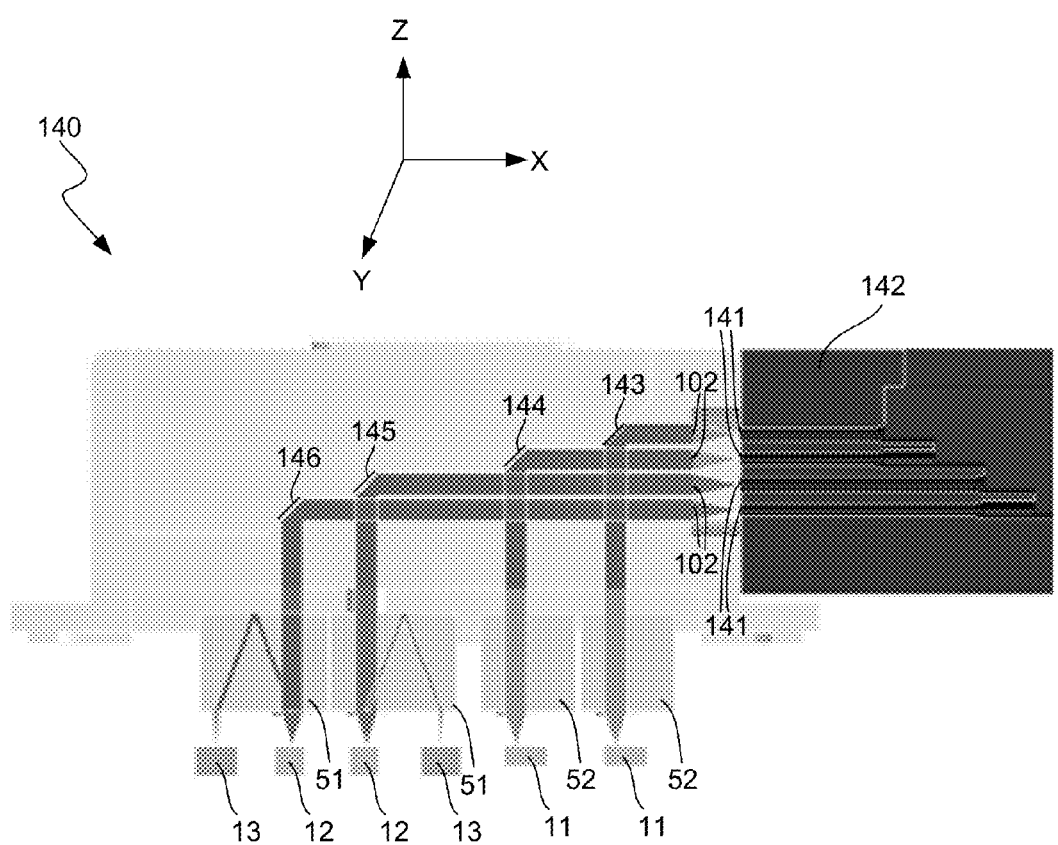
FIG. 9 illustrates a side cross-sectional view of an optical interface device in accordance with another illustrative embodiment.

FIG. 9 illustrates a side cross-sectional view of the optical interface device 140 in accordance with another illustrative embodiment. In accordance with this embodiment, the fiber count has been increased to forty-eight. The ends of the optical fibers 141 are arranged in a 4×12 array inside of the MTP ferrule 142. However, the optical interface device 140 can have the same height (Z-dimension) as the optical interface devices 100 and 130 even though the fiber count has doubled. Two lens blocks 51 and two lens blocks 52 are used for coupling light between the optical interface device 140 and the ends of the fibers 141. The optical pathways are closer together in the optical interface device 140 than they are in the optical interface devices 100 and 130, but the chips 11 are far enough away from the chips 13 to prevent optical crosstalk. The chips 11-13 and the lens blocks 51 and 52 may be mounted on the same cold block, which would have a configuration similar to that shown in FIGS. 1A and 1B, except that it would have additional mounting surfaces or wider mounting surfaces than those shown in FIGS. 1A and 1B since they have to accommodate twice as many chips and lens blocks.

The optical interface devices 100, 130 and 140 are typically made of molded plastic because molded plastic parts can be made with high precision at low cost. However, other materials and processes may be used to make the optical interface device. The lens block 51 of the lens assembly 40 is typically made of glass using a photolithographic process so that the optical element 61 (FIG. 5) can be easily formed and coated with a metallic thin film, although other materials and processes may be used to make the lens block 51. The lens block 52 may be made of any suitable material (e.g., plastic, glass, etc.) using any suitable process (e.g., molding, photolithography, etc.).

It should be noted that although the optical interface devices 100, 130 and 140 and the cold block 10 are typically used together, they can be used separately. For example, the optical interface devices 100, 130 and 140 may be secured to a PCB on which the chips 11-13 and the lens assembly 40 are mounted or secured. Likewise, the cold block 10 can be used with an optical interface device that is different from the optical interface devices 100, 130 and 140. Also, it is not necessary for the optical interface device to be configured to mate with an MTP ferrule. The optical interface device may be configured to mate with other types of optical connectors. Also, although the optical pathways are shown as being turned by 90°, the turning angles can be other than 90°.

Figure 10:
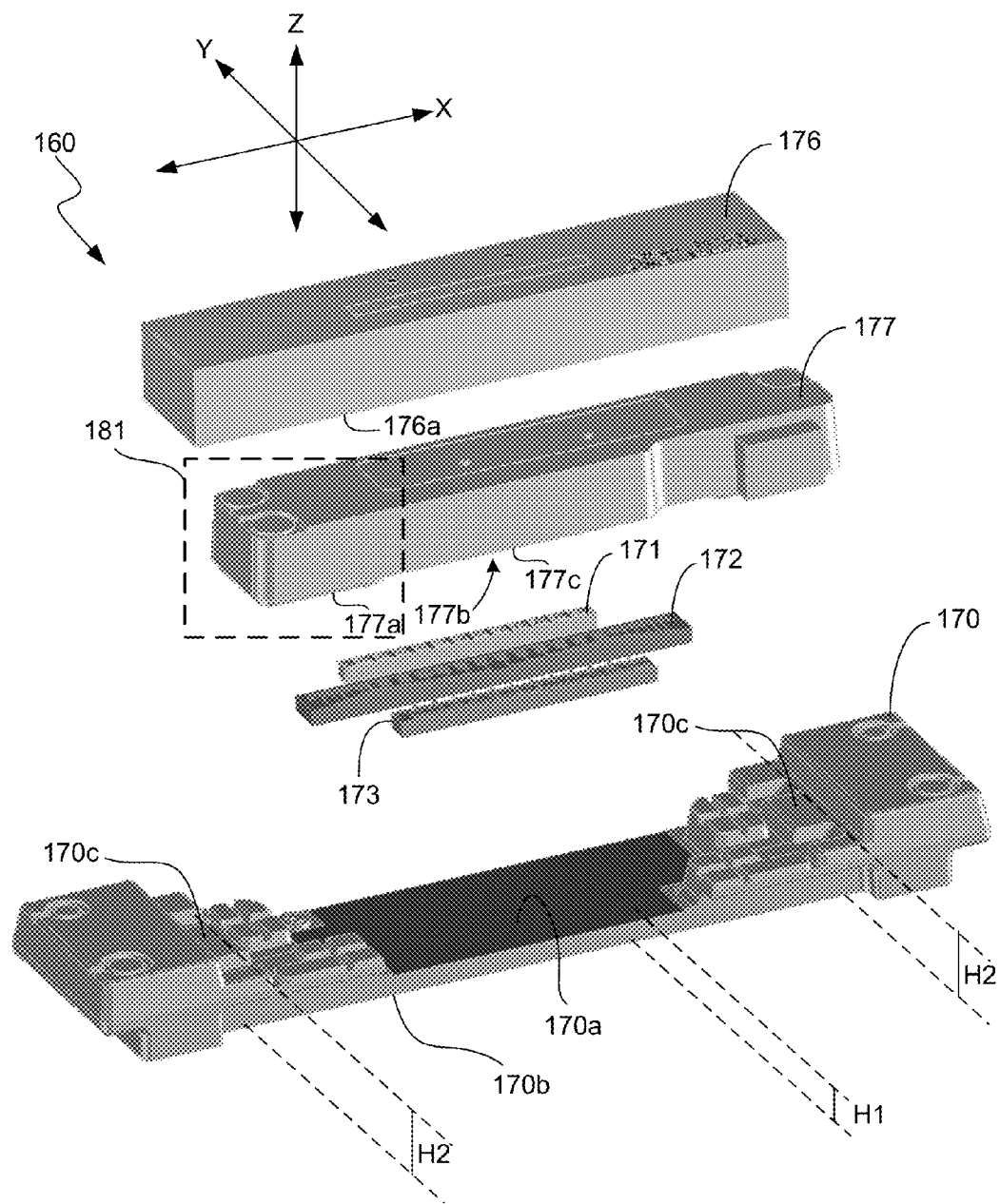
FIG. 10 illustrates an exploded perspective view of a COB mounting arrangement in accordance with another illustrative embodiment that includes a cold block, a plurality of optoelectronic components, and a lens assembly comprising first and second lens blocks.
Figure 11:
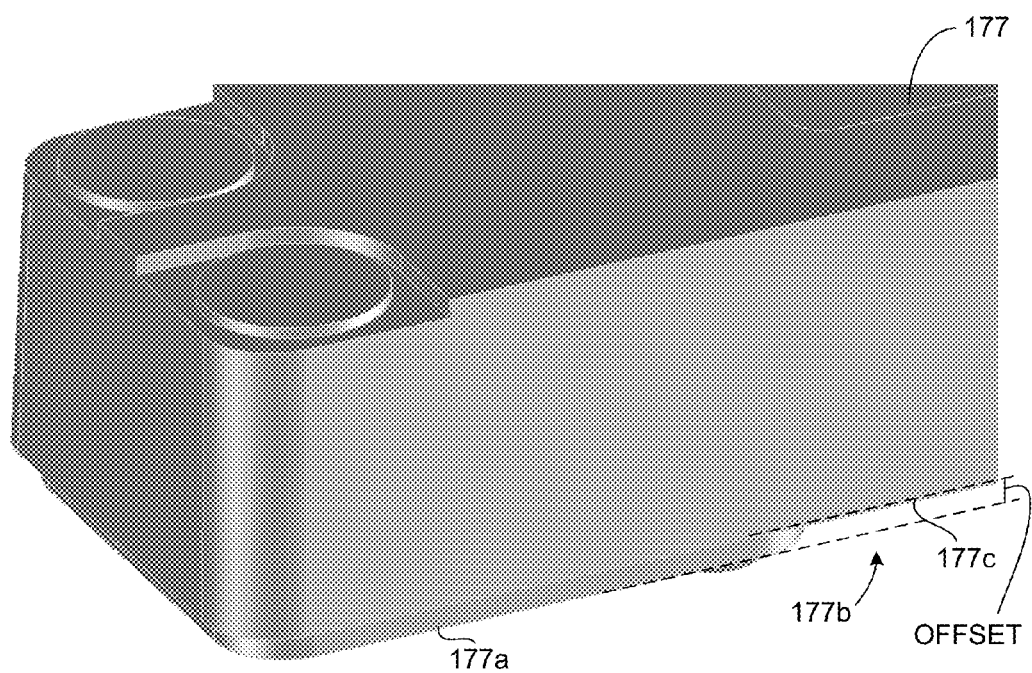
FIG. 11 illustrates an expanded view of the portion of the second lens block shown in FIG. 10 inside of the dashed box labeled with reference numeral 181.

FIG. 10 illustrates an exploded perspective view of a COB mounting arrangement 160 in accordance with another illustrative embodiment that includes a cold block 170, a plurality of optoelectronic components 171, 172 and 173, and a lens assembly comprising first and second lens blocks 176 and 177, respectively. FIG. 11 illustrates an expanded view of the portion of the second lens block 177 shown in FIG. 10 inside of the dashed box labeled with reference numeral 181. The optoelectronic components 171, 172 and 173 are a vertical cavity surface emitting laser diode (VCSEL) array semiconductor chip, a monitor photodiode array semiconductor chip and a vertical cavity surface emitting laser diode (VCSEL) array semiconductor chip, respectively. In accordance with this illustrative embodiment, the optoelectronic chips 171, 172 and 173 have the same heights. Each array chip has a 1×N array of optoelectronic elements formed in it, where N is a positive integer that is equal to or greater than 2. In accordance with this illustrative embodiment, N=12.

The cold block 170 is similar to the cold block 10 shown in FIGS. 1A and 1B. One important difference between the cold blocks 10 and 170 is that the cold block 170 has a single mounting surface 170a for mounting of the optoelectronic components 171-173 rather than the multiple mounting surfaces 10a and 10b that are used for this purpose in the embodiment shown in FIG. 1A. The mounting surface 170a is at a height H1 relative to a lower surface 170b of the cold block 170. In other words, the stepped surface comprising surfaces 10a and 10b at heights H1 and H2, respectively, in FIG. 1A has been replaced by a single mounting surface 170a at height H1 in FIG. 10.

The first and second lens blocks 176 and 177, respectively, have lower surfaces 176a and 177a, respectively, that abut a second mounting surface 170c of the cold block 170 when the first and second lens blocks 176 and 177 are mounted on the cold block 170. The second mounting surface 170c is at a height H2 relative to the lower surface 170b of the cold block 170. Thus, like the embodiment shown in FIGS. 1A and 1B, the lens blocks 176 and 177 shown in FIG. 10 are mounted on the same surface of the cold block 170.

Unlike the embodiment shown in FIGS. 1A and 1B, the lower surface 177a of the lens block 177 has an offset 177b formed in a portion of the lower surface 177a. The lower surface 176a of the lens block 176 does not have a similar offset formed therein. The offset 177b formed in the lens block 177 causes an optical surface 177c of the lens block 177 to be farther away from the optoelectronic elements of optoelectronic component 173 than the lower surface 176a of the lens block 176 is from the optoelectronic elements of the optoelectronic components 171 and 172. The lower surface 176a of the lens block 176 is the optical surface of the lens block 176. The lens block 176 performs optical operations associated with optoelectronic components 171 and 172, whereas the lens block 177 performs optical operations associated only with optoelectronic component 173. The offset 177b ensures that mounting of the lens block 177 on mounting surface 170c optically aligns the lens block 177 with the optoelectronic component 173 in the Z-direction. Mounting of the lens block 176 on mounting surface 170c optically aligns the lens block 176 with the optoelectronic components 171 and 172 in the Z-direction.

Thus, the offset 177b performs a function analogous to the function performed by the stepped surface 10a/10b in the embodiment of FIG. 1A to ensure that the mounting of the components on the cold block 170 results in precise, passive optical alignment in the Z-dimension.

The cold block may have configurations other than the configuration shown in the figures and described herein. The configuration of the cold block will depend largely on the shapes and sizes of the chips that are intended to be mounted on it. For example, the distances of the mounting surfaces of the cold block from the bottom surface of the cold block will depend largely on the heights of the chips and the intended distances of features of the chips from the lens assembly. The lens assembly may also have configurations other than the configuration described herein. For example, if it is not necessary to monitor the optical power levels of the laser diodes, the optical element 61 and any other optical elements of the lens assembly 40 that are used to operate on the monitor light beam can be eliminated. Also, although the light sources and light detectors have been described as being laser diodes and photodiodes, respectively, any suitable light sources and light detectors can be used. In addition, although the parallel optical communications module has been described herein as being a parallel optical transceiver module, it may instead be a parallel optical transmitter or receiver module, in which cases either two light source array chips or two light detector array chips will be used. Also, although the cold block has been described as being used for mounting array chips, individual light source chips or light detector chips, sometimes referred to in the industry as singlets, may be used. For example, twelve individual laser diode chips may be mounted adjacent one another on the cold blocks 10 or 170 to form a 1×12 laser diode array.

The invention has been described with reference to illustrative embodiments for the purpose of demonstrating principles and concepts of the invention. As will be understood by those skilled in the art in view of the description being provided herein, many modifications other than those described herein may be made to the embodiments described herein while still achieving the goals of the invention, and all such modifications are within the scope of the invention.

What is claimed is:

1. An optical communications module comprising:
   a circuit board having at least a first surface;
   a cold block mounted on the first surface, the cold block being made of a material of high thermal conductivity, the cold block having at least first and second mounting surfaces, the first mounting surface being at a first height and the second mounting surface being at a second height, the first and second heights corresponding to first and second distances of the first and second mounting surfaces from a lower surface of the cold block, respectively, the first and second heights being different from one another;
   at least a first optoelectronic component mounted on the first mounting surface; and
   a lens assembly comprising at least a first lens block, the first lens block being mounted on the second mounting surface, wherein mounting the first optoelectronic component and the first lens block on the first and second mounting surfaces, respectively, optically aligns the first optoelectronic component and the first lens block with one another in a direction normal to the first mounting surface.

2. The optical communications module of claim 1, wherein the cold block further comprises at least a third mounting surface that is at a third height that corresponds to a third distance of the third mounting surface from the lower surface of the cold block, the third distance being different from the first and second distances, and wherein the module further comprises:
   at least a second optoelectronic component mounted on the third mounting surface; and
   at least a second lens block of the lens assembly mounted on the second mounting surface, wherein mounting the second optoelectronic component and the second lens block on the third and second mounting surfaces, respectively, optically aligns the second optoelectronic component and the second lens block with one another in a direction normal to the third mounting surface.

3. The optical communications module of claim 1, wherein the cold block further comprises at least a third mounting surface that is at a third height that corresponds to a third distance of the third mounting surface from the lower surface of the cold block, the third distance being different from the first and second distances, and wherein the module further comprises:
   at least a second optoelectronic component mounted on the first mounting surface; and
   at least a second lens block of the lens assembly mounted on the third mounting surface, wherein mounting the second optoelectronic component and the second lens block on the first and third mounting surfaces, respectively, optically aligns the second optoelectronic component and the second lens block with one another in a direction normal to the third mounting surface.

4. The optical communications module of claim 1, further comprising:
   at least a second optoelectronic component mounted on the first mounting surface; and
   at least a second lens block of the lens assembly mounted on the second mounting surface, the second lens block having an offset formed in a portion of the lower surface thereof that offsets an optical surface of the second lens block from a non-offset portion of the lower surface of the second lens block, wherein mounting the second optoelectronic component and the second lens block on the first and second mounting surfaces, respectively, optically aligns the second optoelectronic component and the second lens block with one another in a direction normal to the second mounting surface.

5. The optical communications module of claim 2, wherein the first optoelectronic component is a first semiconductor chip having a 1×N array of light detectors therein, where N is a positive integer that is greater than or equal to 2, and wherein the second optoelectronic component is a second semiconductor chip having a 1×N array of light sources therein.

6. The optical communications module of claim 5, further comprising:
   at least a third optoelectronic component mounted on the third mounting surface adjacent the second semiconductor chip, the third optoelectronic component being optically aligned with the second lens block in a direction normal to the third mounting surface of the cold block.

7. The optical communications module of claim 6, wherein the third optoelectronic component is a third semiconductor chip having a 1×N array of light detectors therein.

8. The optical communications module of claim 2, wherein the first and second lens blocks each have at least one recess formed in the lower surface thereof, the recesses being filled with an adhesive material, wherein the adhesive material bonds the first and second lens blocks to the second mounting surface.

9. The optical communications module of claim 8, wherein the first optoelectronic component is bonded to the first mounting surface by an adhesive material.

10. The optical communications module of claim 1, further comprising:
    at least a first integrated circuit (IC) chip mounting on the circuit board adjacent the cold block, the first IC chip being electrically interconnected with the circuit board and with the first optoelectronic component.

11. The optical communications module of claim 2, further comprising:
    an optical interface device, the optical interface device having a first array of lenses disposed on a front face thereof, the optical interface device being configured to mate with an optical connector that holds ends of optical fibers in an array of optical fiber ends such that the ends of the optical fibers are aligned with respective lenses of the first array of lenses, and wherein the optical interface device couples light beams between the first and second lens blocks and the ends of the optical fibers and wherein the first and second lens blocks couple light beams between the first and second optoelectronic components, respectively, and the optical interface device.

12. The optical communications module of claim 11, wherein the optical interface device further comprises:
    a first reflector aligned with a first row of the ends of the optical fibers, with a first row of the lenses of the first array and with a first array of optoelectronic elements disposed in the first optoelectronic component, wherein the first reflector turns an optical pathway along which light beams travel between the ends of the optical fibers and the first array of optoelectronic elements; and a second reflector aligned with a second row of the ends of the optical fibers, with a second row of the lenses of the first array and with a second array of optoelectronic elements disposed in the second optoelectronic component, wherein the second reflector turns an optical pathway along which light beams travel between the ends of the optical fibers of the second row and the second array of optoelectronic elements.

13. The optical communications module of claim 12, wherein the first and second reflectors turn the respective optical pathways by an angle of 90°.

14. The optical communications module of claim 12, wherein the first and second reflectors are first and second distances away from the lenses of the first array, respectively, in a direction that is parallel to optical axes of the lenses of the first array, and wherein a spacing between the first and second optoelectronic components on the cold block depends at least in part on the first and second distances of the first and second reflectors from the lenses of the first array.

15. The optical communications module of claim 14, wherein the first optoelectronic component is a first semiconductor chip having a 1×N array of light detectors therein, where N is a positive integer that is greater than or equal to 2, and wherein the second optoelectronic component is a second semiconductor chip having a 1×N array of light sources therein, wherein there are N lenses in the first row of the first array of lenses and N lenses in the second row of the first array of lenses, and wherein there are N ends of optical fibers arranged in the first row of the ends of the optical fibers and N ends of optical fibers arranged in the second row of the ends of the optical fibers, the first row of lenses of the first array of lenses collimating N light beams passing out of the ends of the first row of the ends of the optical fibers, the first reflector receiving the N collimated light beams and reflecting the N collimated light beams toward the 1×N array of light detectors, the lens assembly focusing the N collimated light beams onto respective light detectors of the 1×N array of light detectors, the lens assembly collimating light beams emitted by the 1×N array of light sources into N collimated light beams and directing at least first portions of the N collimated light beams toward the second reflector, the second reflector reflecting the first portions of the N collimated light beams toward the second row of lenses of the first array, the second row of lenses of the first array focusing the first portions of the N collimated light beams on the ends of the optical fibers of the second row of the ends of the optical fibers.

16. The optical communications module of claim 14, wherein the first optoelectronic component is a first semiconductor chip having a 1×N array of light detectors therein, and wherein the second optoelectronic component is a second semiconductor chip having a 1×N array of light detectors therein, where N is a positive integer that is greater than or equal to 2, wherein there are N lenses in the first row of the first array of lenses and N lenses in the second row of the first array of lenses, and wherein there are N ends of optical fibers arranged in the first row of the ends of the optical fibers and N ends of optical fibers arranged in the second row of the ends of optical fibers, the first and second rows of lenses of the first array of lenses collimating 2N light beams passing out of the ends of the first and second rows of the ends of the optical fibers, the first reflector reflecting N of the collimated light beams toward the 1×N array of light detectors of the first semiconductor chip, the second reflector reflecting N of the collimated light beams toward the 1×N array of light detectors of the second semiconductor chip, the lens assembly focusing N of the reflected collimated light beams onto N respective light detectors of the first semiconductor chip and focusing N of the reflected collimated light beams onto N light detectors of the second semiconductor chip.

17. The optical communications module of claim 14, wherein the first optoelectronic component is a first semiconductor chip having a 1×N array of light sources therein, and wherein the second optoelectronic component is a second semiconductor chip having a 1×N array of light sources therein, where N is a positive integer that is greater than or equal to 2, wherein there are N lenses in the first row of the first array of lenses and N lenses in the second row of the first array of lenses, and wherein there are N ends of optical fibers arranged in the first row of the ends of the optical fibers and N ends of optical fibers arranged in the second row of the ends of optical fibers, the lens assembly collimating light beams emitted by the light sources of the first and second semiconductor chips into 2N collimated light beams and directing at least first portions of the 2N collimated light beams toward the first and second reflectors, the first reflector reflecting the first portions of N of the 2N collimated light beams toward the first row of lenses of the first array, the second reflector reflecting the first portions of N of the 2N collimated light beams toward the second row of lenses of the first array, the first and second rows of lenses of the first array focusing the first portions of the collimated light beams reflected by the first and second reflectors on the ends of the optical fibers of the first and second rows of the ends of the optical fibers, respectively.

18. A chip-on-board mounting arrangement for use in an optical communications module for mounting components and for dissipating heat, the arrangement comprising:
a cold block having a lower surface and at least first, second and third mounting surfaces opposite the lower surface, the cold block being made of a material of high thermal conductivity, the first mounting surface being at a first height, the second mounting surface being at a second height, and the third mounting surface being at a third height, the first, second and third heights corresponding to first, second and third distances of the first, second and third mounting surfaces from the lower surface of the cold block, respectively, at least the first and third heights being different from one another;
at least a first optoelectronic component mounted on the first mounting surface;
at least a second optoelectronic component mounted on the second mounting surface; and
a lens assembly mounted on the third mounting surface, wherein mounting the first optoelectronic component, the second optoelectronic component and the lens assembly on the first, second and third mounting surfaces, respectively, optically aligns the first and second optoelectronic components with the lens assembly in directions normal to the first and second mounting surfaces.

19. The chip-on-board mounting arrangement of claim 18, further comprising:
at least a third optoelectronic component mounted on the second mounting surface, the third optoelectronic component being optically aligned with the lens assembly in a direction normal to the second mounting surface.

20. A chip-on-board mounting arrangement for use in an optical communications module and for mounting components and for dissipating heat, the arrangement comprising:
a cold block mounted having a lower surface and at least first and second mounting surfaces opposite the lower surface, the cold block being made of a material of high thermal conductivity, the first mounting surface being at a first height and the second mounting surface being at a second height, the first and second heights corresponding to first and second distances of the first and second mounting surfaces from the lower surface of the cold block, respectively, the first and second heights being different from one another;

at least first and second optoelectronic components mounted on the first mounting surface; and a lens assembly mounted on the second mounting surface, the lens assembly comprising at least first and second lens blocks having lower surfaces that are in abutment with the second mounting surface, the second lens block having an offset formed in a portion of the lower surface thereof that offsets an optical surface of the second lens block from a non-offset portion of the lower surface of the second lens block, wherein mounting the first and second optoelectronic components on the first mounting surface and mounting the first and second lens blocks on the second mounting surface optically aligns the first and second optoelectronic components with the first and second lens blocks, respectively, in directions normal to the first and second mounting surfaces.

\* \* \* \* \*